US011503559B2

(12) United States Patent
Damnjanovic et al.

(10) Patent No.: US 11,503,559 B2
(45) Date of Patent: Nov. 15, 2022

(54) CELL ACQUISITION IN FREQUENCY DIVERSITY IMPLEMENTING OPPORTUNISTIC FREQUENCY SWITCHING FOR FRAME BASED EQUIPMENT ACCESS

(71) Applicant: QUALCOMM Incorporated, San Diego, CA (US)

(72) Inventors: Aleksandar Damnjanovic, Del Mar, CA (US); Xiaoxia Zhang, San Diego, CA (US); Yongbin Wei, La Jolla, CA (US); Srinivas Yerramalli, San Diego, CA (US); Tamer Kadous, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 16/401,876

(22) Filed: May 2, 2019

(65) Prior Publication Data

US 2019/0373571 A1 Dec. 5, 2019

Related U.S. Application Data

(60) Provisional application No. 62/677,483, filed on May 29, 2018.

(51) Int. Cl.
*H04W 56/00* (2009.01)
*H04B 17/318* (2015.01)
(Continued)

(52) U.S. Cl.
CPC ...... *H04W 56/0045* (2013.01); *H04B 17/104* (2015.01); *H04B 17/318* (2015.01); *H04B 17/364* (2015.01)

(58) Field of Classification Search
CPC combination set(s) only.
See application file for complete search history.

(56) References Cited

U.S. PATENT DOCUMENTS

| 2012/0020312 | A1* | 1/2012 | Lv | H04L 1/1887 |
| | | | | 370/329 |
| 2013/0183992 | A1* | 7/2013 | Laroia | H04B 7/0695 |
| | | | | 455/452.1 |

(Continued)

FOREIGN PATENT DOCUMENTS

| EP | 3079409 A1 | 10/2016 |
| EP | 3188525 A1 | 7/2017 |

(Continued)

OTHER PUBLICATIONS

International Search Report and Written Opinion—PCT/US2019/030623—ISA/EPO—dated Aug. 22, 2019.

*Primary Examiner* — Kodzovi Acolatse
*Assistant Examiner* — Mon Cheri S Davenport
(74) *Attorney, Agent, or Firm* — Liem T. Do

(57) ABSTRACT

Cell acquisition is disclosed in frequency diversity configured for frame based equipment (FBE) access, such as using opportunistic frequency switching. A user equipment (UE) begins cell acquisition by synchronizing to an available communication channel of an available cell in response to detection of a synchronization signal block (SSB) associated with a network on which the UE communicates. The UE receives system information associated with the available cell from a serving base station, wherein the system information includes identification of at least: a link indicator identifying linked communication channels available for opportunistic switching, sensing occasion offsets for each of the linked channels, and access information associated with each of the linked channels. The UE measures a channel quality for each available channel. The base station transmits (Continued)

this system information on each of the linked channels and then monitors the allocated random access resources for signals from the UEs.

20 Claims, 10 Drawing Sheets

(51) Int. Cl.
*H04B 17/364* (2015.01)
*H04B 17/10* (2015.01)

(56) References Cited

U.S. PATENT DOCUMENTS

| | | |
|---|---|---|
| 2015/0373626 A1 | 12/2015 | Yi et al. |
| 2016/0128084 A1 | 5/2016 | Novlan et al. |
| 2016/0295345 A1 | 10/2016 | Oh |
| 2017/0142751 A1* | 5/2017 | Liu .................. H04L 5/0092 |
| 2018/0092128 A1 | 3/2018 | Um et al. |
| 2019/0306734 A1* | 10/2019 | Huang ................ H04W 24/10 |

FOREIGN PATENT DOCUMENTS

| | | |
|---|---|---|
| EP | 3247153 A1 | 11/2017 |
| WO | WO-2019005310 A1 | 1/2019 |
| WO | WO-2019027536 A1 | 2/2019 |

* cited by examiner

CELL ACQUISITION IN FREQUENCY DIVERSITY IMPLEMENTING OPPORTUNISTIC FREQUENCY SWITCHING FOR FRAME BASED EQUIPMENT ACCESS

CROSS-REFERENCE TO RELATED APPLICATIONS

This application claims the benefit of U.S. Provisional Patent Application No. 62/677,483, entitled, "CELL ACQUISITION IN FREQUENCY DIVERSITY IMPLEMENTING OPPORTUNISTIC FREQUENCY SWITCHING FOR FRAME BASED EQUIPMENT ACCESS," filed on May 29, 2018, which is expressly incorporated by reference herein in its entirety.

BACKGROUND

Field

Aspects of the present disclosure relate generally to wireless communication systems, and more particularly, to providing cell acquisition in frequency diversity configured for frame based equipment (FBE) access, such as using opportunistic frequency switching based on offset sequences of medium sensing occasions for the carrier frequencies.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Substantial interference and even the inability to access the medium on a given frequency may be experienced in some situations, particularly in areas of high demand. For example, communications utilizing contention-based shared spectrum (e.g., unlicensed spectrum) may experience cell edge performance issues, such as where receiver nodes can be subject to "hidden node" interference, such as interference from a first node that is visible to a second node, such as a wireless access point, hut not to one or more receiver nodes communicating with the second node. Various procedures have been implemented to contend for access to such contention-based shared spectrum. For example, relatively complex schemes, such as the request to send/clear to send (RTS/CTS) procedure utilized in IEEE802.1.1-2016 standards, have been defined in an effort to reduce the occurrence of hidden node interference in unlicensed spectrum. Such solutions, however, have been technology specific and, depending on the deployment scenario, may be very suboptimal. Moreover, issues such as the inability to access the medium on a given frequency due to congestion are problematic with respect to such procedures. Accordingly, research and development continue to advance wireless technologies not only to meet the growing demand for mobile broadband access, but to advance and enhance the user experience with mobile communications.

SUMMARY

In one aspect of the disclosure, a method of wireless communication includes synchronizing, by a user equipment (UE), to an available communication channel of an available cell in response to detection of a synchronization signal block (SSB) associated with a network on which the UE communicates, receiving, by the UE, system information associated with the available cell from a serving base station, wherein the system information includes identification of at least: a link indicator identifying one or more linked communication channels available for opportunistic switching, one or more sensing occasion offsets for each of the one or more linked communication channels, and access information associated with each of the one or more linked communication channels, and measuring, by the UF, a channel quality for each of the available communication channel and the one or more linked communication channels.

In an additional aspect of the disclosure, a method of wireless communication includes determining, by a base station, a plurality of communication channels for opportunistic switching during communication with one or more UEs, transmitting, by the base station, an SSB, system information, and paging occasions for each communication channel of the plurality of communication channels, wherein the system information includes at least: a link indicator identifying a link between the plurality of communication channels for the opportunistic switching, one or more sensing occasion offsets for the each communication channel of the plurality of communication channels, and access information associated with the each communication channel of the plurality of communication channels, wherein the SSB, system information, and paging occasions are transmitted on the each communication channel of the plurality of communication channels, and monitoring, by the base station, one or more random access resources on the each communication channel of the plurality of communication channels.

In an additional aspect of the disclosure, an apparatus configured for wireless communication may include means for synchronizing, by a UE, to an available communication channel of an available cell in response to detection of an SSB associated with a network on which the UE communicates, means for receiving, by the UE, system information associated with the available cell from a serving base station, wherein the system information includes identification of at least: a link indicator identifying one or more linked communication channels available for opportunistic switching, one or more sensing occasion offsets for each of the one or more linked communication channels, and access information associated with each of the one or more linked communication channels, and means for measuring, by the UE, a channel quality for each of the available communication channel and the one or more linked communication channels.

In an additional aspect of the disclosure, an apparatus configured for wireless communication may include means for determining, by a base station, a plurality of communication channels for opportunistic switching during communication with one or more UEs, means for transmitting, by the base station, an SSB, system information, and paging occasions for each communication channel of the plurality of communication channels, wherein the system information includes at least: a link indicator identifying a link between the plurality of communication channels for the opportunistic switching, one or more sensing occasion offsets for the each communication channel of the plurality of communication channels, and access information associated with the each communication channel of the plurality of communication channels, wherein the SSB, system information, and paging occasions are transmitted on the each communication channel of the plurality of communication channels, and means for monitoring, by the base station, one or more random access resources on the each communication channel of the plurality of communication channels.

In an additional aspect of the disclosure, a non-transitory computer-readable medium having program code recorded thereon. The program code further includes code to synchronize, by a UE, to an available communication channel of an available cell in response to detection of an SSB associated with a network on which the UE communicates, code to receive, by the UE, system information associated with the available cell from a serving base station, wherein the system information includes identification of at least: a link indicator identifying one or more linked communication channels available for opportunistic switching, one or more sensing occasion offsets for each of the one or more linked communication channels, and access information associated with each of the one or more linked communication channels, and code to measure, by the UE, a channel quality for each of the available communication channel and the one or more linked communication channels.

In an additional aspect of the disclosure, a non-transitory computer-readable medium having program code recorded thereon. The program code further includes code to determine, by a base station, a plurality of communication channels for opportunistic switching during communication with one or more UEs, code to transmit, by the base station, an SSB, system information, and paging occasions for each communication channel of the plurality of communication channels, wherein the system information includes at least: a link indicator identifying a link between the plurality of communication channels for the opportunistic switching, one or more sensing occasion offsets for the each communication channel of the plurality of communication channels, and access information associated with the each communication channel of the plurality of communication channels, wherein the SSB, system information, and paging occasions are transmitted on the each communication channel of the plurality of communication channels, and code to monitor, by the base station, one or more random access resources on the each communication channel of the plurality of communication channels.

In an additional aspect of the disclosure, an apparatus configured for wireless communication is disclosed. The apparatus includes at least one processor, and a memory coupled to the processor. The processor is configured to synchronize, by a UE, to an available communication channel of an available cell in response to detection of an SSB associated with a network on which the UE communicates, to receive, by the UE, system information associated with the available cell from a serving base station, wherein the system information includes identification of at least: a link indicator identifying one or more linked communication channels available for opportunistic switching, one or more sensing occasion offsets for each of the one or more linked communication channels, and access information associated with each of the one or more linked communication channels, and to measure, by the UE, a channel quality for each of the available communication channel and the one or more linked communication channels.

In an additional aspect of the disclosure, an apparatus configured for wireless communication is disclosed. The apparatus includes at least one processor, and a memory coupled to the processor. The processor is configured to determine, by a base station, a plurality of communication channels for opportunistic switching during communication with one or more UEs, to transmit, by the base station, an SSB, system information, and paging occasions for each communication channel of the plurality of communication channels, wherein the system information includes at least: a link indicator identifying a link between the plurality of communication channels for the opportunistic switching, one or more sensing occasion offsets for the each communication channel of the plurality of communication channels, and access information associated with the each communication channel of the plurality of communication channels, wherein the SSB, system information, and paging occasions are transmitted on the each communication channel of the plurality of communication channels, and to monitor, by the base station, one or more random access resources on the each communication channel of the plurality of communication channels.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
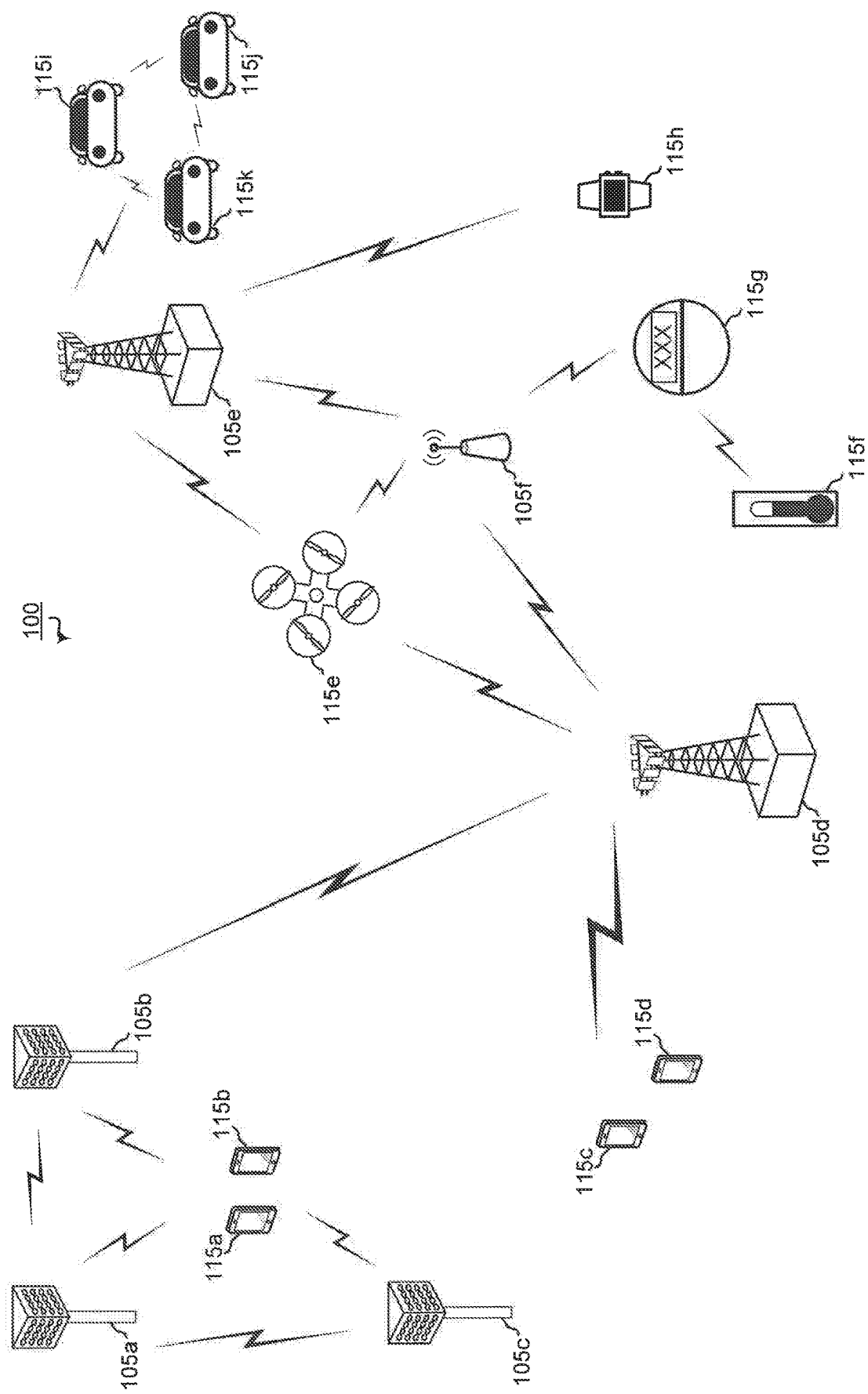
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pica base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UE may also be referred to as internet of everything (IoT) devices, UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
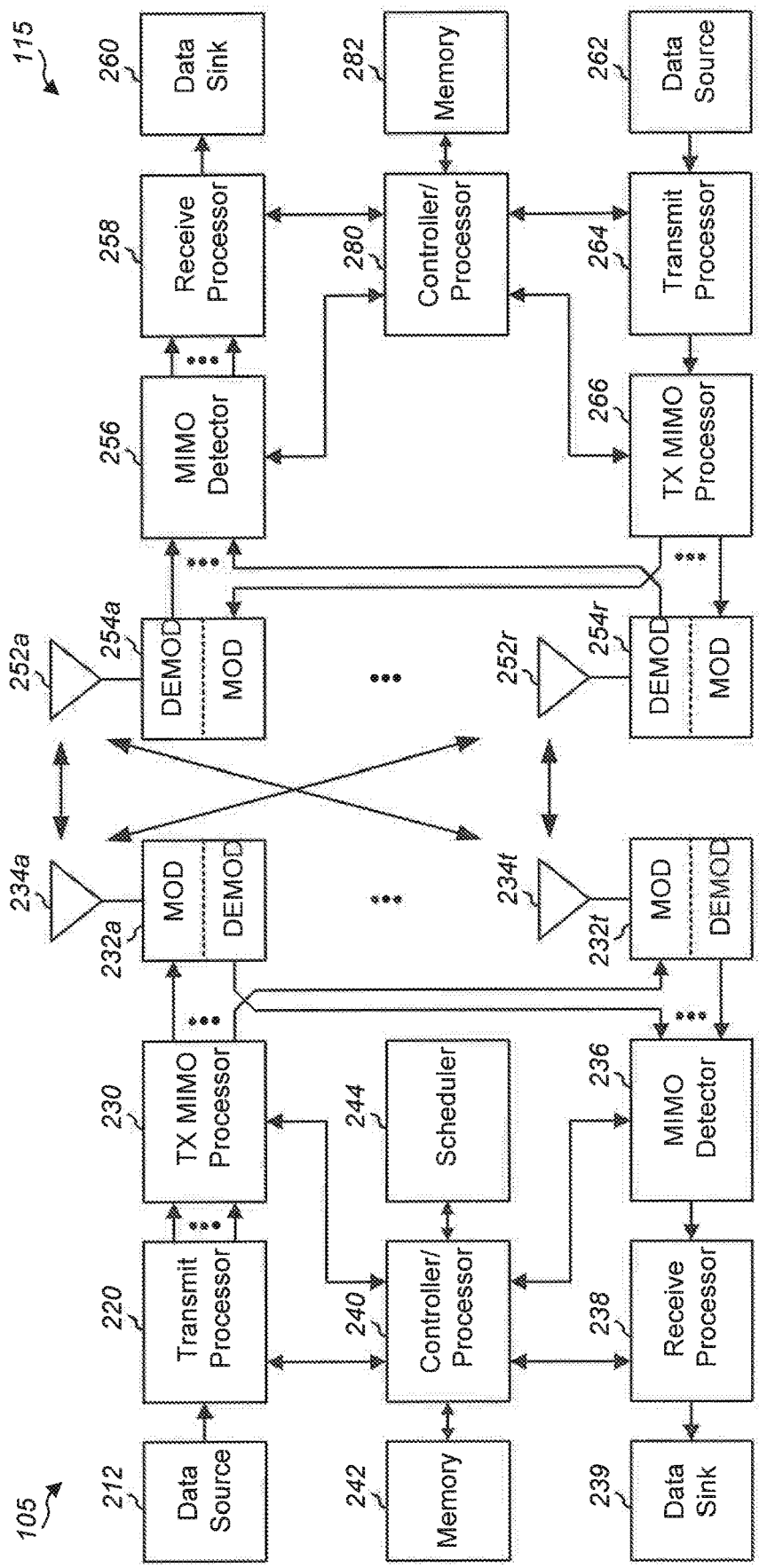
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of functional blocks illustrated in FIGS. 4A, 4B, 5A, and 5B, and/or other processes for the techniques described herein. The controllers/processor 280 and/or other processors and modules at the UE 115 may also perform or direct the execution of functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of traditional medium-sensing procedures to contend for access to an unlicensed shared spectrum may result in communication inefficiencies. For example, receiver nodes can be subject to hidden node interference, which can effectively create outage event wherein a receiver device is blocked from receiving communications via the medium. There could also be other issues, such the inability to access the medium on a given frequency due to congestion.

Systems of 5G network 100, such as one or more base stations 105 and UEs 115, are configured according to concepts of the present disclosure for implementing opportunistic frequency switching providing frequency diversity to avoid or mitigate medium access issues, such as outages due to hidden node interference, in contention-based shared spectrum (e.g., unlicensed spectrum, such as in the 2.4 GHz, 5 GHz, etc. unlicensed bands). Frequency diversity facilitated by embodiments is configured for frame based equipment (FBE) wireless medium access. As will be understood from the discussion below, opportunistic frequency switching procedures implemented according to embodiments may be configured, and even optimized, for FBE access rule compliance. For example, an opportunistic frequency switching procedure implemented in accordance with concepts of the present disclosure may provide European Telecommunications Standards Institute (ETSI) European Standard (EN) 301 893 compliance, such as for deployment with respect to a 5 GHz unlicensed band.

Figure 3A:
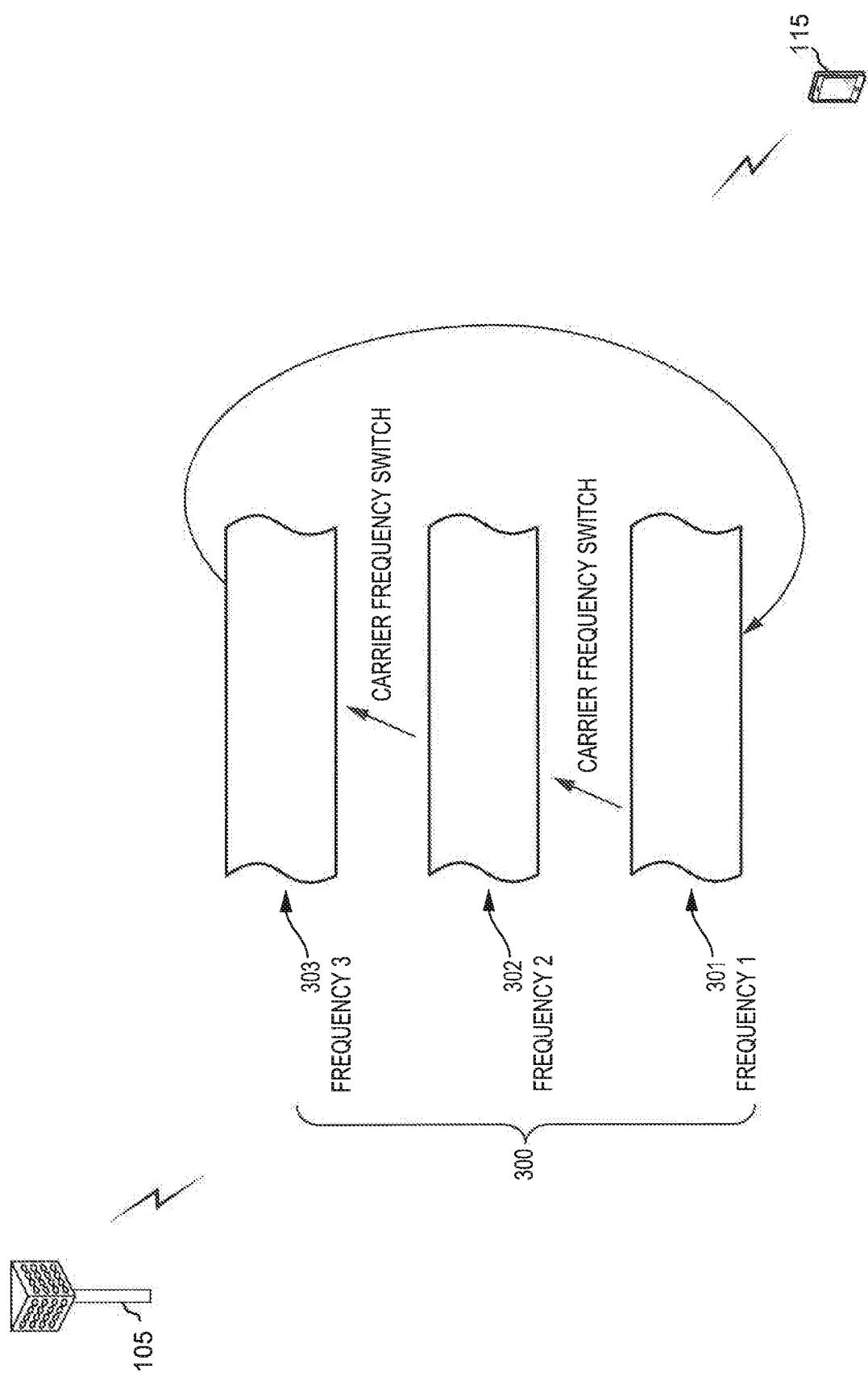
FIG. 3A illustrates an example of a sequence of carrier frequencies as may be utilized in opportunistic frequency switching according to aspects of the present disclosure.

Frequency diversity provided using opportunistic frequency switching of embodiments of the present disclosure utilizes a sequence of carrier frequencies known to a transmitter device (e.g., base station 105 or UE 115) and associated receiver device (e.g., UE 115 in downlink communication with base station 105 or base station 105 in uplink communication with UE 115). For example, as shown in FIG. 3A, sequence of carrier frequencies 300 as may be utilized by various aspects include carrier frequencies 301-303. Carrier frequencies 301, 302, and/or 303 of sequence of carrier frequencies 300 may include adjacent carrier frequencies, carrier frequencies have the same channel spacing, carrier frequencies having different channel spacing, carrier frequencies of different radio frequency spectrum band, etc. The particular configuration of the carrier frequencies and the number of carrier frequencies of a sequence of carrier frequencies may be determined based upon the availability of spectrum, the capabilities of the transmitter and receiver devices, the particular wireless channels for which the carrier frequencies are to be used, etc. Accordingly, the number of carrier frequencies and/or their frequencies and bandwidths may differ than that of examples shown herein.

With regard to the number of carrier frequencies included in a sequence of carrier frequencies, it should be appreciated that there is generally a tradeoff between power consumption and how many frequencies a device monitors. Accordingly, if the medium is congested more carrier frequencies may be used at the expense of power consumption. If the medium is not congested, then different configurations may use fewer carrier frequencies (e.g., two carrier frequencies). Regardless of the particular configuration of the carrier frequencies and the number of carrier frequencies used, both a transmitter device (e.g., base station 105 or UE 115) and associated receiver device (e.g., UE 115 in downlink communication with base station 105 or base station 105 in uplink communication with UE 115) are provided with knowledge of the sequence of carrier frequencies (e.g., the number of carrier frequencies used, the frequency and bandwidth of the carrier frequencies, the sequence serial order of the carrier frequencies, etc.).

In operation of an opportunistic frequency switching procedure, the carrier frequencies may be used serially (i.e., in sequence serial order) or in an ad hoc manner with respect to a wireless channel (e.g., PDCCH, PDSCH, PUCCH, PUSCH, etc.) between the transmitter and receiver devices. For example, as shown in FIG. 3A, switching between carrier frequencies 301-303 of sequence of carrier frequencies 300 is performed serially in a predefined sequence serial order. Alternatively, in an ad hoc implementation, opportunistic frequency switching according may not use a predefined or predetermined schedule for switching carrier frequencies of the sequence of carrier frequencies. Instead, such aspects implement ad hoc carrier frequency switching, such as to switch between carrier frequencies from time to time as may be determined by various factors. For example, a current carrier frequency of a sequence of carrier frequencies may be continued to be used for such time as substantial interference, an outage, etc. (collectively referred to as an event) is not sensed with respect to that carrier frequency. Carrier frequency switching to a next carrier frequency of the sequence of carrier frequencies may be implemented, however, when an event is sensed with respect to the current carrier frequency.

Figure 3B:
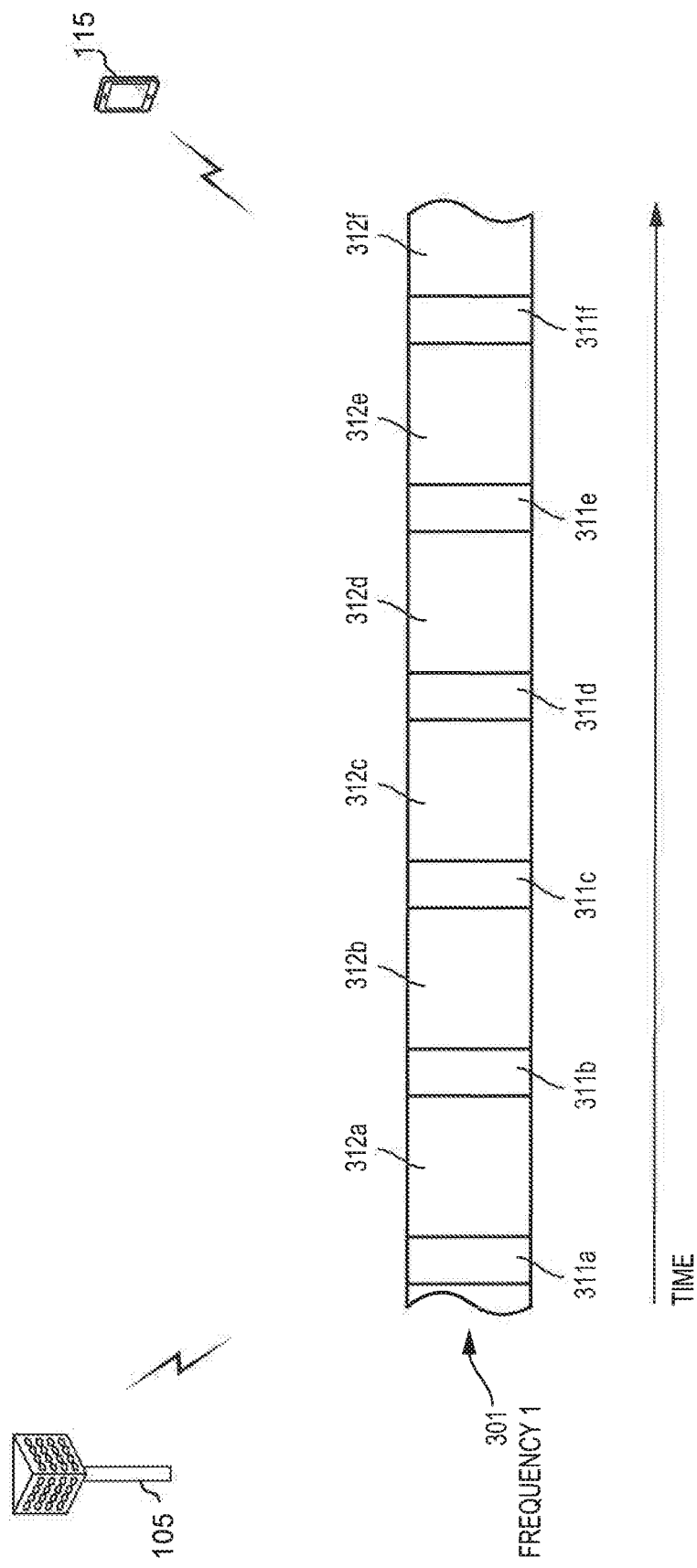
FIG. 3B illustrates an example of a sequence of medium sensing occasions of a carrier frequency utilized in opportunistic frequency switching according to aspects of the present disclosure.

Opportunistic frequency switching may use medium sensing occasions with respect to the carrier frequencies of a sequence of carrier frequencies to detect events (e.g., interference, outages, etc.), such as may be used for event-based carrier frequency switching. For example, as shown in FIG. 3B, a sequence of medium sensing occasions for carrier frequency 301 of sequence of carrier frequencies 300 may be defined in time. In particular, the sequence of medium sensing occasions for carrier frequency 301, as shown in FIG. 3B, include medium sensing occasions 311a-311f having corresponding channel occupancy times (CoTs) 312a-312f disposed therebetween. The medium sensing occasions of a sequence of carrier frequencies may be periodic, such as to define CoTs of equal sizes. Alternatively, the medium sensing occasions of a sequence of carrier frequencies may be aperiodic. In operation, however, there is synchronization between a transmitter device (e.g., base station 105 or UE 115) and associated receiver device (e.g., UE 115 in downlink communication with base station 105 or base station 105 in uplink communication with UE 115) with respect to the timing of the medium sensing occasions of the sequence of carrier frequencies for each carrier frequency of the sequence of carrier frequencies. Accordingly, both a transmitter device (e.g., base station 105 or UE 115) and associated receiver device (e.g., UE 115 in downlink communication with base station 105 or base station 105 in uplink communication with UE 115) are provided with knowledge of the sequence of medium sensing occasions for carrier frequencies of a sequence of carrier frequencies.

Medium sensing occasions (e.g., medium sensing occasions 311*a*-311*f*) of provide periods in which a transmitter device may monitor the respective carrier frequency for determining if an event (e.g., interference, outage, etc.) is detected. Accordingly, the transmitter device does not provide transmission of a signal to a corresponding receiver device using the respective carrier frequency during a medium sensing occasion instance. The CoTs (e.g., CoTs 312*a*-312*f*) of embodiments of the disclosure, however, provide periods in which the transmitter device may provide transmission of a signal (e.g., comprising the components of a particular channel, such as PDCCH, PDSCH, PUCCH, PUSCH, etc.) to the corresponding receiver device using the respective carrier frequency. The period of medium sensing occasion instances is significantly less than the period of COT instances for a respective carrier frequency, such as to facilitate spectrum efficiency.

In operation of an opportunistic frequency switching procedure, the carrier frequency switching implemented may be based in part on the sequence of medium sensing occasions for a carrier frequency. For example, a transmitter device (e.g., base station 105 or UE 115) may monitor a carrier frequency during a medium sensing occasion of the respective schedule of medium sensing occasions for determining if an event (e.g., interference, outage, etc.) is detected. If no event is detected in the medium sensing occasion, the transmitter device may transmit a signal to one or more receiver devices (e.g., UE 115 in downlink communication with base station 105 or base station 105 in uplink communication with UE 115) via the carrier frequency during the CoT following the medium sensing occasion. Such monitoring during medium sensing occasions and transmitting during CoTs may continue with respect to a current carrier frequency of the sequence of carrier frequencies until, for example, such time as an event is detected in a medium sensing occasion or the transmitter device otherwise determines that a carrier frequency switch is warranted (e.g., a signal is not received from a receiver device in a channel scheduled by the signal transmission from the transmitter device, indicating interference or blockage of the transmission on the current carrier frequency of the sequence of carrier frequencies). If an event is detected in the medium sensing occasion, the transmitter device may initiate a carrier frequency switch to a next carrier frequency of the sequence of carrier frequencies and proceed to monitor that carrier frequency during a medium sensing occasion of the respective schedule of medium sensing occasions for determining if an event is detected. Thus, depending upon whether an event is detected in a medium sensing occasion of a carrier frequency, the transmitter device may transmit a signal during a following CoT or initiate a switch to a next carrier frequency, and so on through the carrier frequencies of the sequence of carrier frequencies.

A receiver device may also initiate carrier frequency switching based in part on the sequence of medium sensing occasions for a carrier frequency, although operating separately from transmitter device initiated carrier frequency switching. For example, a receiver device (e.g., UE 115 or base station 105) may monitor a carrier frequency during a period (e.g., CoT) following a medium sensing occasion of the respective schedule of medium sensing occasions for determining if a decodable signal (e.g., preamble, channel state information reference signal (CSI-RS), demodulation reference signal (DMRS), downlink control information (DCI), etc.) from an associated transmitter device (e.g., base station 105 in downlink communication with UE 115 or UE 115 in uplink communication with base station 105) is detected. If a decodable signal is detected in period following the medium sensing occasion, the receiver device may decode and utilized the signal transmitted by the transmitter device via the carrier frequency. Such monitoring during periods (CoTs) following the medium sensing occasions and decoding the signals may continue with respect to a current carrier frequency of the sequence of carrier frequencies until, for example, such time as a decodable signal is not detected. If a decodable signal is not detected in the period following a medium sensing occasion, the receiver device may initiate a carrier frequency switch to a next carrier frequency of the sequence of carrier frequencies and proceed to monitor that carrier frequency during a period following a medium sensing occasion of the respective schedule of medium sensing occasions for determining if a decodable signal is detected. Thus, depending upon whether a decodable signal is detected in a period following a medium sensing occasion of a carrier frequency, the receiver device may decode and utilize a signal or initiate a switch to a next carrier frequency, and so on through the carrier frequencies of the sequence of carrier frequencies.

Figure 3C:
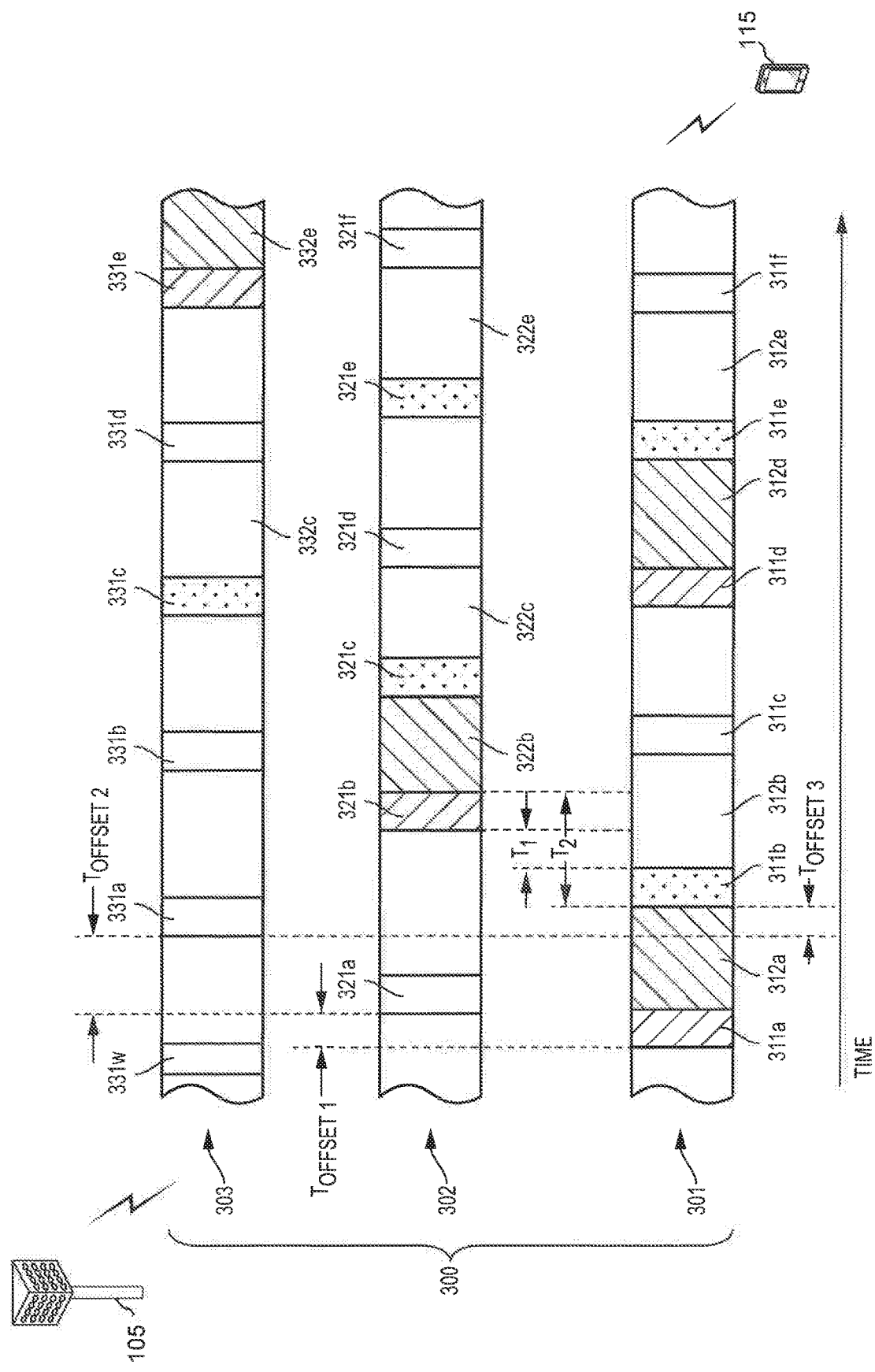
FIG. 3C illustrates an example of offset sequences of medium sensing occasions of the carrier frequencies of a sequence of carrier frequencies as may be utilized in opportunistic frequency switching according to aspects of the present disclosure.

Carrier frequency switching implemented by an opportunistic frequency switching procedure is illustrated in FIG. 3C. In particular, the example of FIG. 3C illustrates that opportunistic frequency switching does not need to initiate carrier frequency switching when single carrier frequency communications is reliable (e.g., there is no outage or little interference).

As shown in FIG. 3C, carrier frequencies 301-303 of sequence of carrier frequencies 300 each have a respective sequence of medium sensing occasions (i.e., sequence of medium sensing occasions 311*a*-311*f* for carrier frequency 301, sequence of medium sensing occasions 321*a*-321*f* for carrier frequency 302, and sequence of medium sensing occasions 331ω-331*e*). In operation as described above, a transmitter device monitors a current carrier frequency during a next medium sensing occasion and determines if an event is detected, and depending upon whether an event is detected the transmitter device may transmit a signal during the following CoT or initiate a switch to a next carrier frequency. Correspondingly, in operation as described above, a receiver device monitors a current carrier frequency during the period following a next medium sensing occasion and determines if a decodable signal from the transmitter device is detected, and depending upon whether a decodable signal is detected the receiver device may decode and utilize a signal or initiate a switch to a next carrier frequency. The foregoing opportunistic frequency switching operation is described in further detail below with reference to the particular example illustrated in FIG. 3C.

In the example illustrated in FIG. 3C, the transmitter device (e.g., base station 105 or UE 115) monitors carrier frequency 301 during medium sensing occasion 311*a* for determining if an event (e.g., interference, outage, etc.) is detected, in the illustrated example, no event is detected in medium sensing occasion 311*a*, and, thus, the transmitter device transmits a signal to one or more receiver devices (e.g., UE 115 in downlink communication with base station 105 or base station 105 in uplink communication with UE 115) via carrier frequency 301 during CoT 312*a* following medium sensing occasion 311*a*. In continuing operation of the transmitter device, the transmitter device again monitors carrier frequency 301 albeit during subsequent medium sensing occasion 311b for determining if an event is detected.

In the illustrated example, an event is detected in medium sensing occasion 311b, and, thus, the transmitter device initiates a carrier frequency switch to carrier frequency 302 (i.e., a next carrier frequency of the sequence of carrier frequencies sequence serial order) and proceeds to monitor that carrier frequency during medium sensing occasion 321b for determining if an event is detected. In the illustrated example, no event is detected in medium sensing occasion 321b, and, thus, the transmitter device transmits a signal to one or more receiver devices via carrier frequency 302 during CoT 322b following medium sensing occasion 321b. In continuing operation of the transmitter device, the transmitter device again monitors carrier frequency 302 albeit during subsequent medium sensing occasion 321c for determining if an event is detected.

In the illustrated example, an event is detected in medium sensing occasion 321c, and, thus, the transmitter device initiates a carrier frequency switch to carrier frequency 303 (i.e., a next carrier frequency of the sequence of carrier frequencies sequence serial order) and proceeds to monitor that carrier frequency during medium sensing occasion 331c for determining if an event is detected. In the illustrated example, an event is detected in medium sensing occasion 331c, and, thus, the transmitter device initiates a carrier frequency switch to carrier frequency 301 (i.e., a next carrier frequency of the sequence of carrier frequencies sequence serial order in light of there being no further carrier frequencies in the carrier frequency sequence) and proceeds to monitor that carrier frequency during medium sensing occasion 311d for determining if an event is detected.

In the illustrated example, no event is detected in medium sensing occasion 311d, and, thus, the transmitter device transmits a signal to one or more receiver devices via carrier frequency 301 during COT 312d following medium sensing occasion 311d. In continuing operation of the transmitter device, the transmitter device again monitors carrier frequency 301 albeit during subsequent medium sensing occasion 311e for determining if an event is detected. In the illustrated example, an event is detected in medium sensing occasion 311e, and, thus, the transmitter device initiates a carrier frequency switch to carrier frequency 302 and proceeds to monitor that carrier frequency during medium sensing occasion 321e for determining if an event is detected. In the illustrated example, an event is detected in medium sensing occasion 321e, and, thus, the transmitter device initiates a carrier frequency switch to carrier frequency 303 and proceeds to monitor that carrier frequency during medium sensing occasion 331e for determining if an event is detected. In the illustrated example, no event is detected in medium sensing occasion 331e, and, thus, the transmitter device transmits a signal to one or more receiver devices via carrier frequency 303 during COT 332e following medium sensing occasion 331e.

It can be seen from the foregoing that, in accordance with the exemplary opportunistic frequency switching procedure, the transmitter device may implement unscheduled carrier frequency switching based in part on the sequence of medium sensing occasions for a carrier frequency. Thus, depending upon whether an event is detected in a medium sensing occasion of a carrier frequency, the transmitter device may transmit a signal during a following CoT or initiate a switch to a next carrier frequency. It should be appreciated that, although the foregoing example describes unscheduled carrier frequency switching in association with detection of events during medium sensing occasions, other implementations may additionally or alternatively use event-based carrier frequency switching in an opportunistic frequency switching procedure based upon other occurrences or non-occurrences indicating that a carrier frequency switch is warranted in accordance with concepts of the present disclosure. Accordingly, embodiments of an opportunistic frequency switching procedure may initiate a carrier frequency switch based on an indication that an event occurred with respect to a signal transmission in a CoT (e.g., a signal is not received from a receiver device in a channel scheduled by the signal transmission from the transmitter device, indicating interference or blockage of the transmission on the current carrier frequency of the sequence of carrier frequencies).

Referring again to the example illustrated in FIG. 3C, the receiver device (e.g., a UE 115) monitors carrier frequency 301 during CoT 312a following medium sensing occasion 311a for determining if a decodable signal (e.g., preamble, CSI-RS, DMRS, DCL, etc.) from the transmitter device is detected. In the illustrated example, a decodable signal is detected in CoT 312a, (e.g., the transmitter device did not detect an event in medium sensing occasion 311a and transmitted a signal in CoT 312a) and, thus, the receiver device decodes and utilized the signal transmitted by the transmitter device via carrier frequency 301. In continuing operation of the receiver device, the receiver device again monitors carrier frequency 301 albeit during subsequent CoT 312b for determining if a decodable signal from the transmitter is detected. In the illustrated example, a decodable signal is not detected in CoT 312b (e.g., the transmitter device detected an event in medium sensing occasion 311b and initiated a carrier frequency switch), and, thus, the receiver device initiates a carrier frequency switch to carrier frequency 302 and proceeds to monitor that carrier frequency during CoT 322b for determining if a decodable signal from the transmitter device is detected.

In the illustrated example, a decodable signal is detected in CoT 322b (e.g., the transmitter device did not detect an event in medium sensing occasion 321b and transmitted a signal in CoT 322b), and, thus, the receiver device decodes and utilized the signal transmitted by the transmitter device via carrier frequency 302. In continuing operation of the receiver device, the receiver device again monitors carrier frequency 302 albeit during subsequent CoT 322c for determining if a decodable signal from the transmitter is detected. In the illustrated example, a decodable signal is not detected in CoT 322c (e.g., the transmitter device detected an event in medium sensing occasion 321c and initiated a carrier frequency switch), and, thus, the receiver device initiates a carrier frequency switch to carrier frequency 303 and proceeds to monitor that carrier frequency during CoT 332c for determining if a decodable signal from the transmitter device is detected.

In the illustrated example, a decodable signal is not detected in CoT 332c (e.g., the transmitter device detected an event in medium sensing occasion 331c and initiated a carrier frequency switch), and, thus, the receiver device initiates a carrier frequency switch to carrier frequency 301 and proceeds to monitor that carrier frequency during CoT 312d for determining if a decodable signal from the transmitter device is detected. In the illustrated example, a decodable signal is detected in CoT 312d, (e.g., the transmitter device did not detect an event in medium sensing occasion 311d and transmitted a signal in CoT 312d) and, thus, the receiver device decodes and utilized the signal transmitted by the transmitter device via carrier frequency

301. In continuing operation of the receiver device, the receiver device again monitors carrier frequency 301 albeit during subsequent CoT 312e for determining if a decodable signal from the transmitter is detected.

In the illustrated example, a decodable signal is not detected in CoT 312e (e.g., the transmitter device detected an event in medium sensing occasion 311e and initiated a carrier frequency switch), and, thus, the receiver device initiates a carrier frequency switch to carrier frequency 302 and proceeds to monitor that carrier frequency during CoT 322e for determining if a decodable signal from the transmitter device is detected. In the illustrated example, a decodable signal is not detected in CoT 322e (e.g., the transmitter device detected an event in medium sensing occasion 321e and initiated a carrier frequency switch), and, thus, the receiver device initiates a carrier frequency switch to carrier frequency 303 and proceeds to monitor that carrier frequency during CoT 332e for determining if a decodable signal from the transmitter device is detected. In the illustrated example, a decodable signal is detected in CoT 332e, (e.g., the transmitter device did not detect an event in medium sensing occasion 331e and transmitted a signal in CoT 332e) and, thus, the receiver device decodes and utilized the signal transmitted by the transmitter device via carrier frequency 303.

It can be seen from the foregoing that, in accordance with the exemplary opportunistic frequency switching procedure, the receiver device may implement carrier frequency switching based in part on the sequence of medium sensing occasions for a carrier frequency. Thus, depending upon whether a decodable signal is detected in a period (e.g., CoT) following a medium sensing occasion of a carrier frequency, the receiver device may decode and utilize a signal or initiate a switch to a next carrier frequency. It should be appreciated that, although the transmitter device may not detect an event in a medium sensing occasion and, thus, provide signal transmission in a following CoT, the signal transmission may nevertheless be interfered with such that the receiver device may not detect a decodable signal from the transmitter device. In such instances, the receiver device may initiate a carrier frequency switch as shown in the above example. Accordingly, it can be seen that although carrier frequency switching implemented by both the transmitter device and the receiver device may be based in part on the sequence of medium sensing occasions, each such device implements the carrier frequency switching separately. Although this separate implementation of carrier frequency switching by the transmitter device and receiver device may result in out-of-sync carrier frequency switches in some situations (e.g., interference or outage during a CoT, but not during a preceding medium sensing occasion), operation of an opportunistic frequency switching procedure of embodiments is self-correcting. For example, the transmitter device may detect a failure of the receiver device to act in accordance with data of the signal transmission of an interfered CoT and, knowing the sequence of carrier frequencies, initiate a carrier frequency switch to synchronize opportunistic frequency switching with the receiver device.

Initiating a carrier frequency switch by the circuitry of a communication device, such as the transmitter device and/or receiver device implementing an opportunistic frequency switching procedure of embodiments of the disclosure, involves some amount of time. For example, the local oscillator (LO) and associated tuner circuitry of the transmitter device may utilize a tuning time ($T_{tune1}$) to reach steady state after a frequency switch. Likewise, the LO and associated tuner circuitry of the receiver device may utilize a tuning time ($T_{tune2}$) to reach steady state after a frequency switch, wherein $T_{tune1}$ and $T_{tune2}$ may be the same or different periods of time. Accordingly, the sequence of medium sensing occasions for each carrier frequency of the sequence of carrier frequencies of embodiments herein may include an offset with respect to the sequence of medium sensing occasions of a next carrier frequency of the sequence of carrier frequencies.

In the example of FIG. 3C, offset time ($T_{offset1}$) is provided with respect to sequence of medium sensing occasions 311a-311f of carrier frequency 301 and sequence of medium sensing occasions 321a-321f of carrier frequency 302. Similarly, in the example of FIG. 3C, offset time ($T_{offset2}$) is provided with respect to sequence of medium sensing occasions 321a-321f of carrier frequency 302 and sequence of medium sensing occasions 331ω-321e of carrier frequency 303. Further, in the example of FIG. 3C, offset time ($T_{offset3}$) is provided with respect to sequence of medium sensing occasions 331ω-331e of carrier frequency 303 and sequence of medium sensing occasions 311a-311f of carrier frequency 301. $T_{offset1}$, $T_{offset2}$, and/or $T_{offset3}$ may be the same or different periods of time. It should be appreciated, however, that the use of such offset times may nevertheless be compliant with existing rules for FBE and ETSI. For example, ETSI EN 301 893 for FBE requires that the periodicity of the frame structure may be changed only every so often (e.g., 200 ms). The offset structure of the sequences of medium sensing occasions of embodiments herein provides a frame structure that may be implemented in compliance with such rules, and may even be optimized for FBE access rules. Accordingly, an opportunistic frequency switching procedure in accordance with concepts herein may readily be deployed in 5 GHz in compliance with existing standards.

Each of $T_{offset1}$, $T_{offset2}$, and/or $T_{offset3}$ of embodiments of the present disclosure is configured to provide a time period sufficient to accommodate operation of circuitry of the transmitter device and/or receiver device in implementing a frequency switch. For example, $T_{offset1}$ provided with respect to sequence of medium sensing occasions 311a-311f of carrier frequency 301 and sequence of medium sensing occasions 321a-321f of carrier frequency 302 may be configured to provide a time period (shown as $T_1$) between the end of a medium sensing occasion of carrier frequency 301 and the beginning of a next occurring medium sensing occasion of carrier frequency 302 that is at least as long as the tuning time of the transmitter device (i.e., $T_1 \geq T_{tune1}$). Additionally or alternatively, $T_{offset1}$ provided with respect to sequence of medium sensing occasions 311a-311f of carrier frequency 301 and sequence of medium sensing occasions 321a-321f of carrier frequency 302 may be configured to provide a time period (shown as $T_2$) between the end of a CoT of carrier frequency 301 and the beginning of a next occurring CoT of carrier frequency 302 that is at least as long as the tuning time of the receiver device (i.e., $T_2 \geq T_{tune2}$). Accordingly, the offset provided by $T_{offset1}$ of embodiments may implement a tuning guard period with respect to the transmitter device and/or receiver device. $T_{offset2}$, and $T_{offset3}$ may be similarly configured tuning guard period with respect to the transmitter device and/or receiver device.

It can be seen from the foregoing that the sequence of medium sensing occasions for each carrier frequency of the sequence of carrier frequencies of embodiments herein may include an offset with respect to the sequence of medium sensing occasions of a next carrier frequency of the sequence of carrier frequencies configured to accommodate frequency tuning by the transmitter device and/or receiver device. Accordingly, the carrier frequency switching of an opportunistic frequency switching procedure implemented according to embodiments of the present disclosure may be based in part on offset sequences of medium sensing occasions for the carrier frequencies.

Figure 3D:
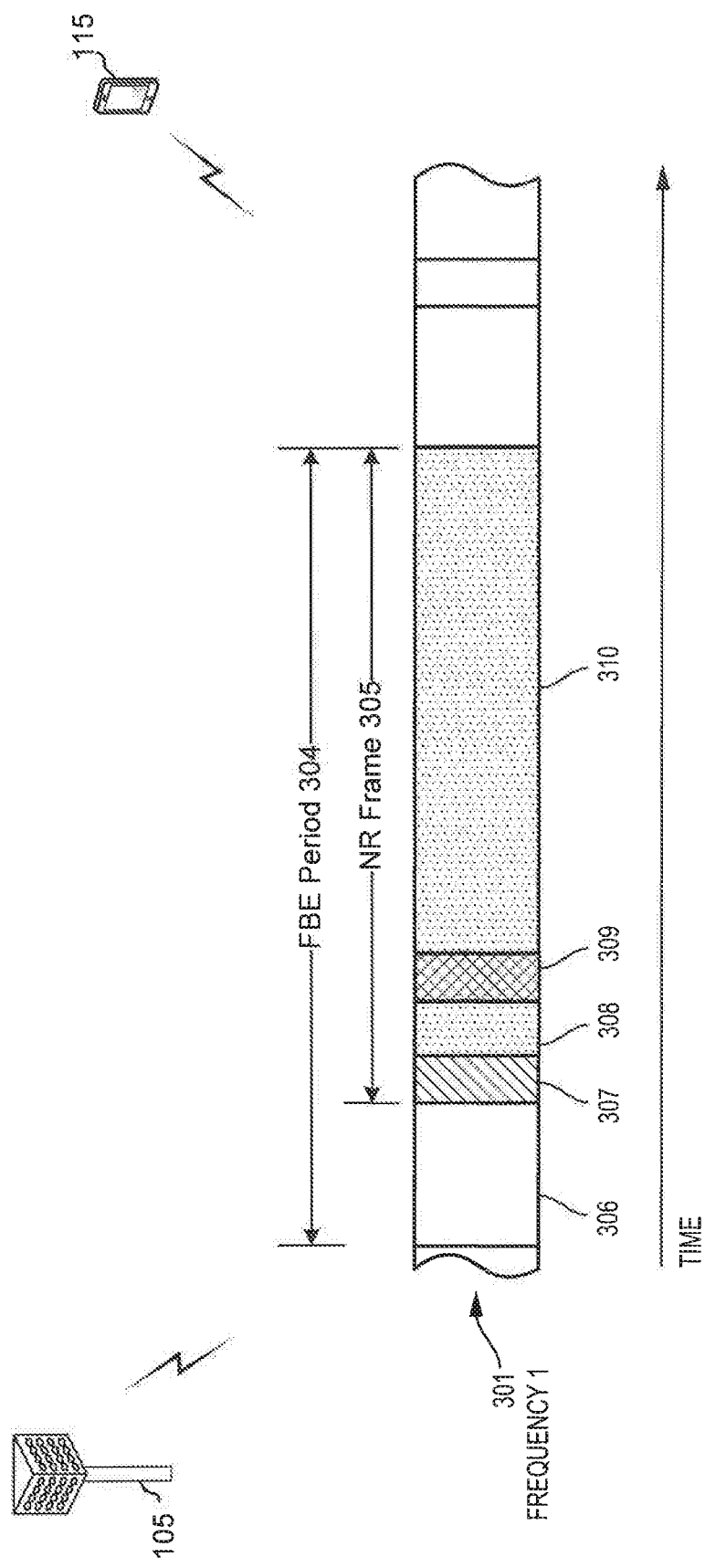
FIG. 3D illustrates an example carrier frequency within a sequence of carrier frequencies used in opportunistic frequency switching according to aspects of the present disclosure.

FIG. 3D illustrates an example carrier frequency within a sequence of carrier frequencies used in opportunistic frequency switching according to aspects of the present disclosure. Communications between base station 105 and LIE 115 may occur using carrier frequency 301 as a part of the opportunistic frequency switching. As it is opportunistic, when there is no interference, communications may remain on the current carrier frequency (e.g., carrier frequency 301. In operations for a frame base equipment (FBE) mode, the transmissions on carrier frequency 301 are broken into segments of the total frame. An FBE frame period 304 includes a medium sensing location 306, preamble transmissions 307, data transmissions 308 and 310, and channel feedback 309 from UE 115. Preamble transmissions 307 may include various reference signal transmissions that base station 105 may transmit after medium sensing occasion 306 (e.g., preamble, synchronization signal block (SSB), demodulation reference signal (DMRS), channel state information reference signals (CSI-RS), and the like). NR frame structure 305 begins with preamble transmission 307 in order for the receiver (UE 115, as illustrated) to be able to quickly determine whether base station 105 secured the medium and, therefore, UE 115 would not switch to one of the other linked frequencies. Channel feedback 309, which may include channel quality indicator (CQI) and other channel state information (CSI) feedback, should be made available at the beginning of the frame when frequency is exchanged in order to provide quick feedback of potentially different radio conditions. The transmissions 308 and 310 provide the CoT of the FBE period 304.

In obtaining cell access, a UE, such as UE 115, would monitor for synchronization signals via air SSB to find and then determine an adequate and available channel to connect with or camp on. However, within an FBE mode network that implements opportunistic switching between a set of linked carrier frequencies, a level of complexity may be added in determining the appropriate adequate channel for connection among the identified linked carrier frequencies. With reference to FIG. 3D, UE 115 would perform cell selection procedure and after detecting SSB within preamble transmission 307. After selecting the best suitable channel (the channel having the best quality conditions and within the same public land mobile number (PLMN) associated with UE 115), UE 115 acquires the corresponding system information (SI). The SI on each carrier frequency can point to another or multiple other of the linked carrier frequencies used for the opportunistic switching. The system information may also contain identification of the sensing occasion offsets for each of the linked carriers. Base station 105 transmits this SI on each of the linked carriers, such that when UE 115 registers to any one of carrier frequencies 301-303, it will obtain the identification of the other carrier frequencies in sequence of carrier frequencies 300 as well as the sensing occasions for each linked carrier, paging information for each linked carrier, and the like. Thus, UE 115 may access any of carrier frequencies 301-303 through the information obtained in the SI received on any one of the carrier frequencies 301-303. UE 115 may then register with the network using one of the sequence of carrier frequencies 300 for the random access procedure and data exchange. The best suitable channel may be any of carrier frequencies 301-303 of the sequence of carrier frequencies 300.

Figures 4A, 4B:
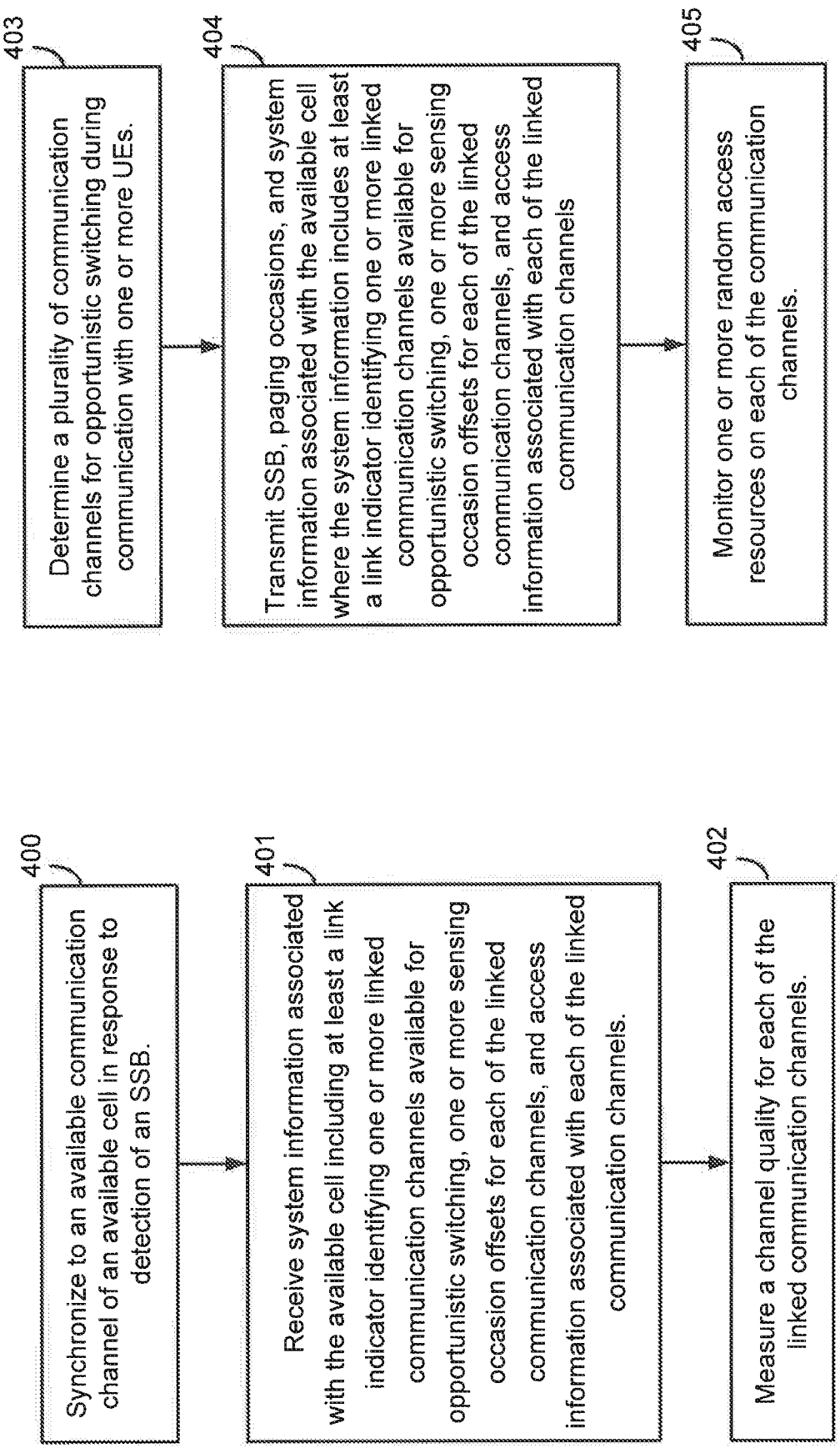
FIG. 4A is a block diagram illustrating example blocks executed by a UE to implement one aspect of the present disclosure.
FIG. 4B is a block diagram illustrating example blocks executed by a base station to implement one aspect of the present disclosure.
Figure 6:
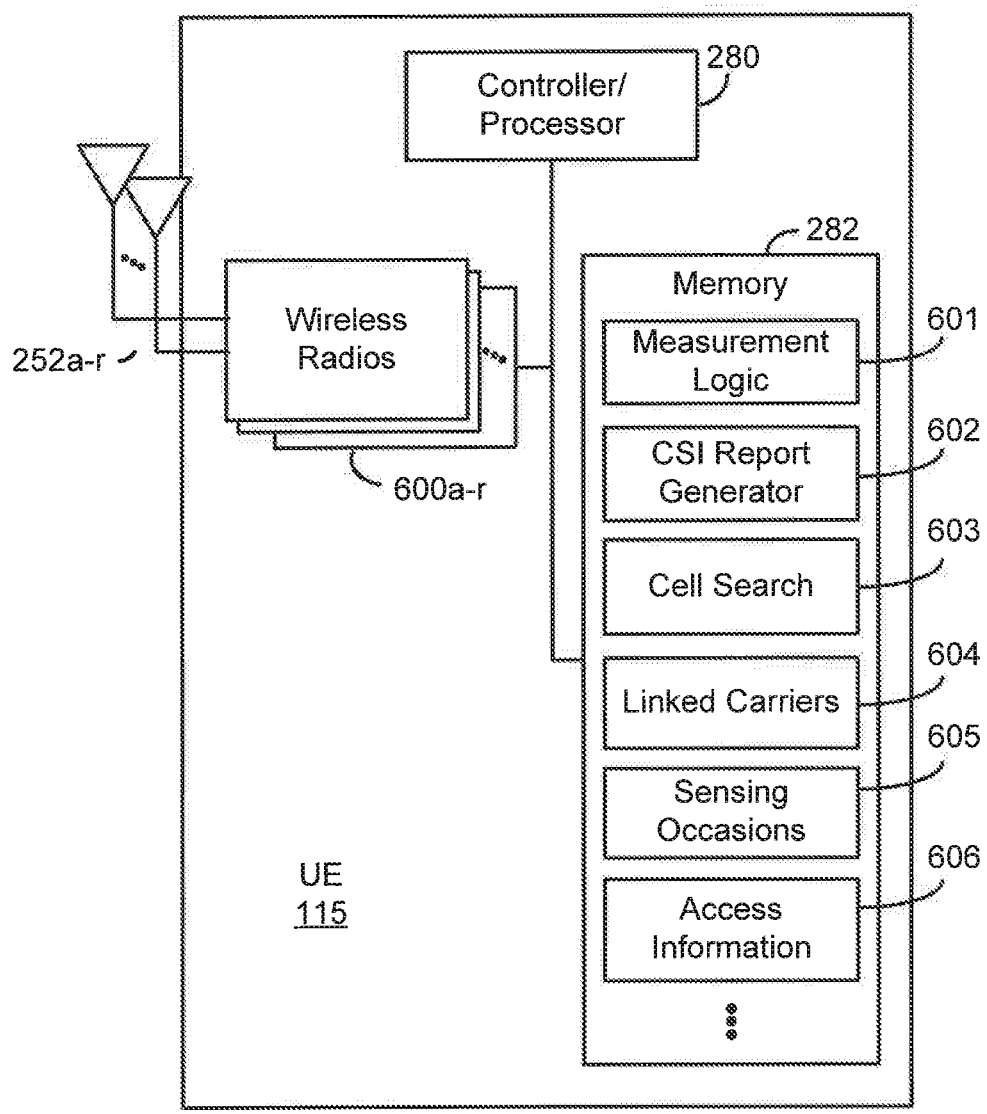
FIG. 6 is a block diagram illustrating a UE configured according to one aspect of the present disclosure.

FIG. 4A is a block diagram illustrating example blocks executed to implement one aspect of the present disclosure. The example blocks will also be described with respect to UE 115 as illustrated in FIG. 6. FIG. 6 is a block diagram illustrating UE 115 configured according to one aspect of the present disclosure, UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115, UE 115, under control of controller/processor 280, transmits and receives signals via wireless radios 600a-r and antennas 252a-r. Wireless radios 600a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE synchronizes to a suitable communication channel of an available cell in response to detection of an SSB associated with a network on which the UE communicates. A UE, such as UE 115, when initiating the cell search procedures monitors accessible frequencies for an SSB. As UE 115 detects an SSB via antennas 252a-r and wireless radios 600a-r, it may initially couple to the channel to further check for suitability. The example network described with respect to the blocks of FIG. 4A, in which UE 115 operates, includes FBE mode operations that implement opportunistic carrier switching.

At block 401, the UE receives system information associated with the available cell from a serving base station, wherein the system information includes identification of at least a link indicator identifying one or more linked communication channels available for opportunistic switching, one or more sensing occasion offsets for each of the one or more linked communication channels, and access information associated with each of the one or more linked communication channels. Once UE 115 synchronizes with the channel, it may begin decoding systems information, physical broadcast channel (PBCH) signals, and the like to determine whether the channel is a suitable communication channel, that is not only whether the signal quality is sufficient, but whether the PLMN identified in the system information coincides with the PLMN of the network to which UE 115 belongs. If the first attempted channel turns out to be from another network, UE 115 will continue to attempt the next strongest signal detected with an SSB. Once UE 115 finds an appropriately suitable communication channel, it may then register with the network and decode the remaining system information including the identification of each of the linked communication channels in the sequence of frequency carriers used for the opportunistic switching, the medium sensing occasion offsets for each of the linked communication channels, random access resources available across the channels, and any paging occasions.

At block 402, the UE measures a channel quality for each of the suitable communication channel and the one or more linked communication channels. In the initial cell search, UE 115 measures the individual channels to determine channels that may be suitable for registration. UE 115, under control of controller/processor 280, executes measurement logic 601, stored in memory 282. The execution environment of measurement logic 601 allows UE 115 to measure signal and channel quality information with regard to the detected channels.

After UE 115 camps on the suitable communication channel, it would perform quality measurements not only on the current communication channel on which it is camped, but will measure the channel quality of the other linked communication channels in the sequence of linked communication channels and evaluate the measurements in combination. UE 115 may use these measurement to initiate cell reselection to the next communication channel in the sequence when the quality of the current channel falls below a certain threshold and when the quality of the next linked channel exceeds a minimum quality threshold.

In one aspect, weighted or non-weighted averaging may be used in the measurements to determine which of linked communication channels should be selected for cell reselection by UE 115. Averaging may reduce the frequency that reselection occurs by looking at the channel quality over a longer period of time. The aspects that include weighting may result in favoring a particular carrier frequency that is more active or perhaps carrier frequency within a certain frequency band, or the like. Other aspects may provide for UE 115 to consider a maximum value of the measurement across the linked communication channels.

Figure 7:
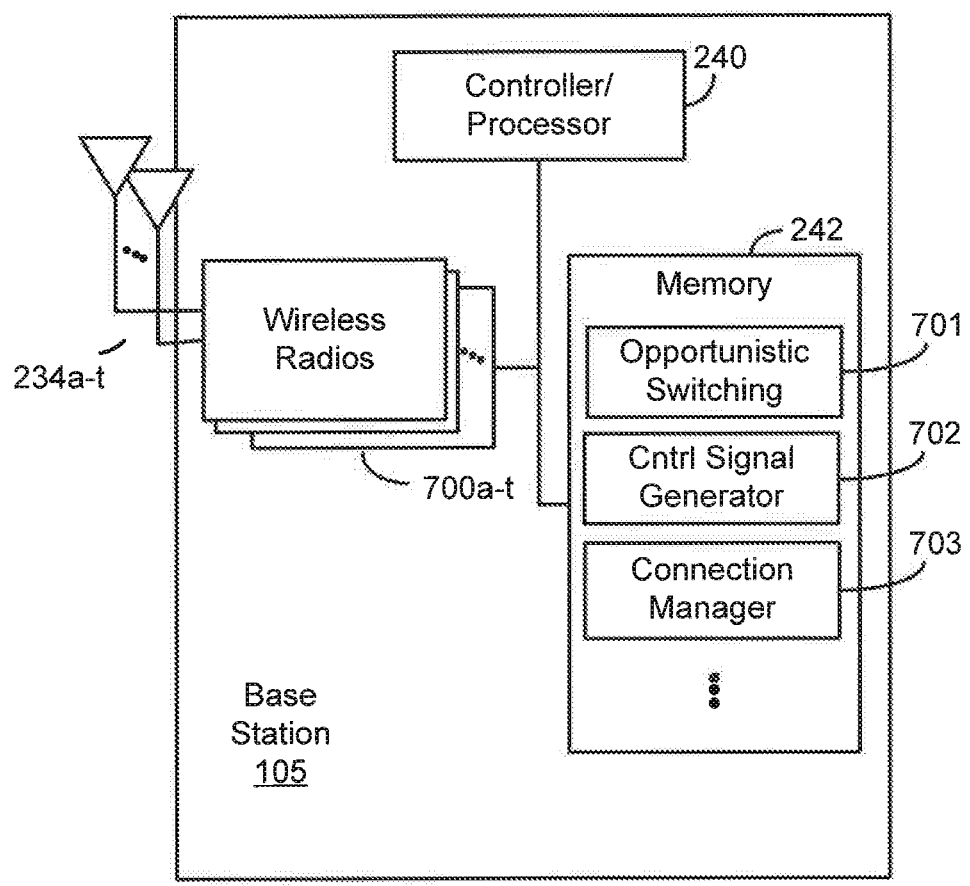
FIG. 7 is a block diagram illustrating base station 105 configured according to one aspect of the present disclosure.

FIG. 4B is a block diagram illustrating example blocks executed to implement one aspect of the present disclosure. The example blocks will also be described with respect to base station 105 as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700*a-t* and antennas 234*a-t*. Wireless radios 700*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 403, a base station determines a plurality of communication channels for opportunistic switching during communication with one or more UEs. In the example aspects described with respect to FIGS. 4A and 4B, the network on which the base station, such as base station 105, and UE 115 operate uses FBE mode communications with opportunistic switching. In order to implement the opportunistic switching feature, base station 105, under control of controller/processor 240, executes opportunistic switching logic 701, stored in memory 242. The execution environment of opportunistic switching logic 701 provides for base station 105 to determine a set of communication channels available (e.g., carrier frequencies, bandwidth parts (MVPs), etc.) that are to be linked together in a sequence for opportunistic switching when a current channel experiences interference. Base station 105, accordingly, determines the different communication channels to link fir the opportunistic switching, assigns medium sensing occasions offsets between each of the linked channels, and the access information for each channel.

At block 404, the base station transmits, on each of the plurality of communication channels, an SSB, system information, and paging occasions for each communication channel of the plurality of communication channels, wherein the system information includes at least a link indicator identifying a link between the plurality of communication channels for the opportunistic switching, one or more sensing occasion offsets for the each communication channel of the plurality of communication channels, and access information associated with the each communication channel of the plurality of communication channels. Under control of controller/processor 240, base station 105 executes control signal generator 702, stored in memory 242. The execution environment of control signal generator 702 uses the known system information and the additional information identified the parameters of the opportunistic switching feature and generates control signals, including SSB, the indication of the linked communication channels, sensing occasion offsets, random access resources, paging occasions, and the like. Base station 105 transmits or broadcasts such control signaling via wireless radios 700*a-t* and antennas 234*a-t*.

At block 405, the base station monitors one or more random access resources on the each communication channel of the plurality of communication channels. In order to control access to the network, base station 105, via antennas 234*a-t* and wireless radios 700*a-t*, monitors for random access request signals on the random access resources on each of the linked communication channels. Base station 105 will begin communications once the random access process has completed after detecting a random access request on any of the linked communication channels.

Figure 5:
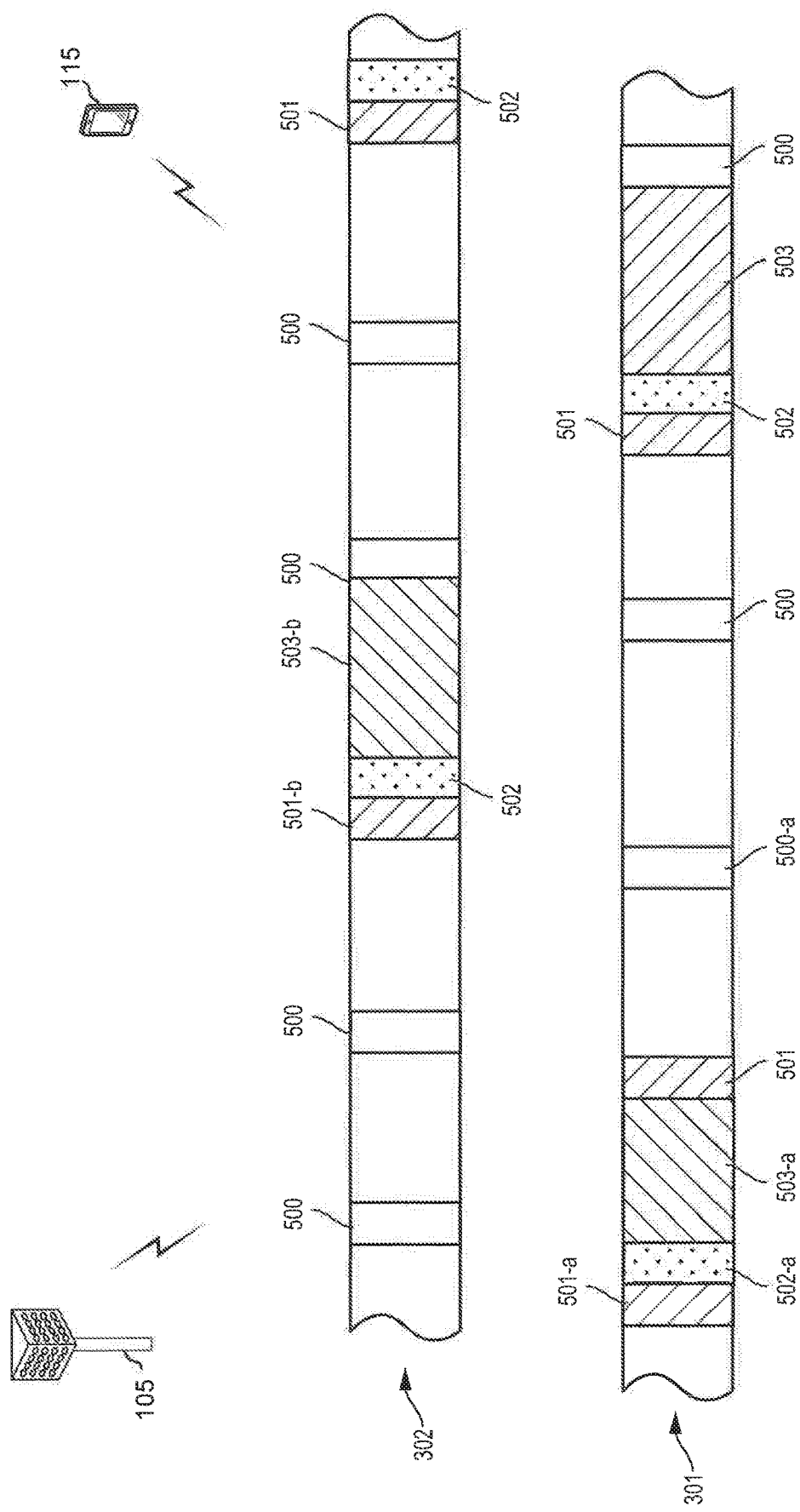
FIG. 5 is a block diagram illustrating an example cell acquisition between a UE and base station configured according to an aspect of the present disclosure in an FBE mode network operating opportunistic switching among two carrier frequencies.

FIG. 5 is a block diagram illustrating an example cell acquisition between UE 115 and base station 105 configured according to an aspect of the present disclosure in an FBE mode network operating opportunistic switching among two carrier frequencies 301-302. The sequence of linked carriers for the opportunistic switching illustrated in FIG. 5, includes carrier frequencies 301 and 302. Within the frame work of each carrier frequency, sensing occasion offsets define locations of each medium sensing location 500 in each of carrier frequencies 301 and 302. The results of such medium sensing occasions may be success, in which case base station 105 will have secured the fixed frame period for communication, or failure, in which case base station 105 may execute the opportunistic switching to attempt channel access at the next medium sensing occasion in another carrier frequency of the sequence of linked carrier frequencies.

Upon medium sensing occasion success 501, base station 105 will transmit preamble transmissions 502 on each of carrier frequencies 301 and 302. Preamble transmissions 502 include various reference signals, access information, and system information, such as SSB, SI, paging occasions, and the like. The period of transmission of preamble transmissions 502 may be different on each of carrier frequencies 301 and 302, as illustrated, or may be the same. After each successful sensing occasion, such as medium sensing occasion success 501, base station 105 transmits preamble transmissions 502 according to the known periodicity. Base station 105 transmits such preamble transmissions 502 and then monitors each configured random access resource (e.g., PRACH resources) on both of carrier frequencies 301 and 302.

UE 115 may begin the cell search in the same manner as when such opportunistic switching were not implemented. However, after UE 115 detects the SSB and decodes the system information from preamble transmissions 502, it discovers the configuration of the opportunistic switching process, including the carriers in the sequence of linked carrier frequencies, sensing occasion offsets among the FBE frames, SSB measurement timing configuration (SMTC), and the like, for each of the carriers (carrier frequencies 301-302) included in the sequence. As base station 105 transmits preamble transmissions 502 in each of carrier frequencies 301 and 302, which ever carrier frequency UE 115 selects in its cell search, it may obtain all of the access information for the sequence of linked carriers for the opportunistic switching procedure, UE 115 may then use the identified random access resources in preamble transmissions 502 to register with the selected carrier frequency.

Once initial registration has been completed to the selected carrier frequency (e.g., carrier frequency 301 or 302), UE 115 may perform measurements on each of carrier frequencies 301 and 302, UE 115 may decide on cell reselection based on the combined measurements across carrier frequencies 301 and 302. In one aspect, weighted or non-weighted averaging may be used to determine which of carrier frequencies 301 and 302 should be selected for cell reselection by UE 115. Averaging may reduce the frequency that reselection occurs by looking at the channel quality over a longer period of time. The aspects that include weighting may result in favoring a particular carrier frequency that is more active or perhaps carrier frequency within a certain frequency band, or the like. Other aspects may provide for UE 115 to consider a maximum value of the measurement across carrier frequencies 301 and 302.

The use of opportunistic carrier switching in FBE mode network operations can improve the reliability of the system as it adds frequency diversity to the communication network. This increased reliability may be beneficial for IoT applications in industrial environment in particular. As noted above, when measuring the quality of signals, UE 115 combines the measurements of the linked communication channels to take into account presence of multiple carriers.

After medium sensing occasion success 501-*a*, base station 105 transmits preamble transmissions 502-*a*. UE 115 detects the SSB within preamble transmissions 502-*a* and determine carrier frequency 301 to be the favorable suitable carrier. UE 115 decodes the system information and obtains the information on all of the carrier frequencies used for opportunistic switching in additional to medium sensing offsets, random access resources, and paging occasions for each of carrier frequencies 301 and 302. UE 115 uses the random access resources to complete registration with carrier frequency 301.

It should be appreciated that, although example embodiments have been described herein with reference to a base station (e.g., any of base stations 105) comprising a transmitter device and a UE (e.g., any of UEs 115) comprising a receiver device, opportunistic frequency switching implemented according to embodiments of the present disclosure may utilize other devices as the transmitter device and/or receiver device. For example, a UE (e.g., any of UEs 115) may be utilized as a transmitter device and a base station (e.g., any of base stations 105) may be utilized as a receiver device in accordance with some implementations of an opportunistic frequency switching procedure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   synchronizing, by a user equipment (UE), to a first communication channel of available communication channels of an available cell in response to detection of a synchronization signal block (SSB) associated with a network on which the UE communicates;
   receiving, by the UE, system information associated with the available cell from a serving base station, wherein the system information includes identification of at least:
      a link indicator identifying one or more second communication channels available for opportunistic switching from the first communication channel to the one or more second communication channels;
      one or more sensing occasion offsets for each of the one or more second communication channels, wherein the one or more sensing occasion offsets establish a tuning guard period for the UE to facilitate switching from the first communication channel to the one or more second communication channels;
      access information associated with each of the one or more second communication channels; and
   measuring, by the UE, a channel quality for each of the first communication channels and the one or more second communication channels.

2. The method of claim 1, wherein the link indicator further indicates a serial sequence of switching of the one or more second communications channels.

3. The method of claim 1, wherein the access information includes identification of one or more of:
   random access resources, and
   an SSB measurement timing configuration (SMTC),
   for each of the available communication channels and the one or more second communication channels.

4. The method of claim 1, further including:
   re-measuring, by the UE in an idle mode, a subsequent channel quality of each of the available communication channels and the one or more second communication channels;
   comparing, by the UE, communication quality of each channel of the available communication channels and the one or more second communication channels; and
   selecting, by the UE, a next available communication channel between one of: the available communication channels and the one or more second communication channels, wherein the selection is based on a highest communication quality result of the comparing.

5. The method of claim 4, wherein the communication quality includes one of:
   the subsequent channel quality; or
   an average channel quality between the channel quality and the subsequent channel quality.

6. The method of claim 5, wherein the average channel quality is one of:
   an equal weight average, or a weighted average.

7. A method of wireless communication, comprising:
   determining, by a base station, a plurality of communication channels for opportunistic switching during communication with one or more user equipments (UEs);
   transmitting, by the base station, a synchronization signal block (SSB), system information, and paging occasions for each communication channel of the plurality of communication channels, wherein the system information includes at least:
      a link indicator identifying a link between the plurality of communication channels for the opportunistic switching,
      one or more sensing occasion offsets for the each communication channel of the plurality of communication channels, wherein the one or more sensing occasion offsets establish a tuning guard period for the UE to facilitate opportunistic switching, and
      access information associated with the each communication channel of the plurality of communication channels,
   wherein the SSB, system information, and paging occasions are transmitted on the each communication channel of the plurality of communication channels; and
   monitoring, by the base station, one or more random access resources on the each communication channel of the plurality of communication channels.

8. The method of claim 7, further including:
   detecting, by the base station, a random access request from a UE of the one or more UEs in a random access resource of the one or more random access resources on a first communication channel of the plurality of communication channels; and
   establishing, by the base station, communication with the UE using the first communication channel.

9. The method of claim 7, wherein the link indicator further indicates a serial sequence of switching of the one or more linked communications channels.

10. The method of claim 7, wherein the access information includes identification of one or more of:
   the one or more random access resources, and
   an SSB measurement timing configuration (SMTC),
for each communication channel of the plurality of communication channels.

11. An apparatus configured for wireless communication, the apparatus comprising:
   at least one processor; and
   a memory coupled to the at least one processor,
   wherein the at least one processor is configured:
      to synchronize, by a user equipment (UE), to a first communication channel of available communication channels of an available cell in response to detection of a synchronization signal block (SSB) associated with a network on which the UE communicates;
      to receive, by the UE, system information associated with the available cell from a serving base station, wherein the system information includes identification of at least:
         a link indicator identifying one or more second communication channels available for opportunistic switching from the first communication channel to the one or more second communication channel;
         one or more sensing occasion offsets for each of the one or more second communication channels, wherein the one or more sensing occasion offsets establish a tuning guard period for the UE to facilitate switching from the first communication channel to the one or more second communication channels, and
         access information associated with each of the one or more second communication channels; and
      to measure, by the UE, a channel quality for each of the available communication channels and the one or more linked communication channels.

12. The apparatus of claim 11, wherein the link indicator further indicates a serial sequence of switching of the one or more second communications channels.

13. The apparatus of claim 11, wherein the access information includes identification of one or more of:
   random access resources, and
   an SSB measurement timing configuration (SMTC),
for each of the available communication channels and the one or more second communication channels.

14. The apparatus of claim 11, further including configuration of the at least one processor:
   to re-measure, by the UE in an idle mode, a subsequent channel quality of each of the available communication channels and the one or more second communication channels;
   to compare, by the UE, communication quality of each channel of the available communication channels and the one or more second communication channels; and
   to select, by the UE, a next available communication channel between one of: the available communication channels and the one or more second communication channels, wherein the selection is based on a highest communication quality result of the configuration of the at least one processor to compare.

15. The apparatus of claim 14, wherein the communication quality includes one of:
   the subsequent channel quality; or
   an average channel quality between the channel quality and the subsequent channel quality.

16. The apparatus of claim 15, wherein the average channel quality is one of: an equal weight average, or a weighted average.

17. An apparatus configured for wireless communication, the apparatus comprising:
   at least one processor; and
   a memory coupled to the at least one processor,
   wherein the at least one processor is configured:
      to determine, by a base station, a plurality of communication channels for opportunistic switching during communication with one or more user equipments (UEs);
      to transmit, by the base station, a synchronization signal block (SSB), system information, and paging occasions for each communication channel of the plurality of communication channels, wherein the system information includes at least:
         a link indicator identifying a link between the plurality of communication channels for the opportunistic switching,
         one or more sensing occasion offsets for the each communication channel of the plurality of communication channels, wherein the one or more sensing occasion offsets establish a tuning guard period for the UE to facilitate opportunistic switching, and
         access information associated with the each communication channel of the plurality of communication channels,
      wherein the SSB, system information, and paging occasions are transmitted on the each communication channel of the plurality of communication channels; and
      to monitor, by the base station, one or more random access resources on the each communication channel of the plurality of communication channels.

18. The apparatus of claim 17, further including configuration of the at least one processor:
   to detect, by the base station, a random access request from a UE of the one or more UEs in a random access resource of the one or more random access resources on a first communication channel of the plurality of communication channels; and
   to establish, by the base station, communication with the UE using the first communication channel.

19. The apparatus of claim 17, wherein the link indicator further indicates a serial sequence of switching of the one or more linked communications channels.

20. The apparatus of claim 17, wherein the access information includes identification of one or more of:
   the one or more random access resources, and
   an SSB measurement timing configuration (SMTC),
for each communication channel of the plurality of communication channels.

\* \* \* \* \*